United States Patent [19]

Jensen

[11] Patent Number: 5,045,397
[45] Date of Patent: Sep. 3, 1991

[54] OPTICAL ADHESIVE SYSTEM HAVING LOW REFRACTIVE INDEX

[75] Inventor: John E. Jensen, Newbury Park, Calif.

[73] Assignee: Hughes Aircraft Company, Los Angeles, Calif.

[21] Appl. No.: 14,555

[22] Filed: Feb. 13, 1987

[51] Int. Cl.$^5$ .............................. B32B 9/00; C09J 5/04
[52] U.S. Cl. ..................................... 428/429; 156/99; 156/275.5; 156/275.7; 156/314; 156/332; 333/239; 428/420; 522/60; 522/182; 385/130
[58] Field of Search .................. 522/60, 182; 428/420, 428/429; 350/96.12; 333/239; 156/99, 314, 275.5, 275.7, 332

[56] References Cited

U.S. PATENT DOCUMENTS

| | | | |
|---|---|---|---|
| 2,453,666 | 11/1948 | Kropa | 156/332 |
| 2,921,045 | 1/1960 | Di Martino | 156/332 |
| 3,359,129 | 12/1967 | Mao | 522/60 |
| 4,374,955 | 2/1983 | Gupta et al. | 522/182 |

FOREIGN PATENT DOCUMENTS 240173  7/1960  Australia .............................. 428/429

OTHER PUBLICATIONS

Kirk–Othmer, "Encyclopedia of Chemical Technology", Third Ed., vol. 15, (1981), p. 347.

*Primary Examiner*—John J. Gallagher
*Attorney, Agent, or Firm*—Paul M. Coble; W. K. Denson-Low

[57] ABSTRACT

An optical cement system having an index of refraction of 1.50 or less, which can be used to bond pieces of optical quality glass during the preparation of devices. The surfaces of the glass pieces to be bonded are treated with an organosilane to produce activated sites, to which the adhesive forms a chemical bond. The adhesive is prepared by mixing together a transparent polymerizable monomer having a refractive index of 1.50 or less, a thickener, and an initiator. The adhesive is flowable, and its consistency is determined by the nature of the thickener. A layer of the adhesive is placed between the pieces of organosilane-treated glass, and polymerized by ultraviolet light or other energy, bonding the pieces of glass together with an adhesive having a refractive index less than that of the glass.

5 Claims, 1 Drawing Sheet

OPTICAL ADHESIVE SYSTEM HAVING LOW REFRACTIVE INDEX

BACKGROUND OF THE INVENTION

This invention relates to optical systems, and, more particularly, to an optical cement having a low index of refraction.

Optical devices for transmitting, conducting, and receiving data are of great interest because of the potential for replacing many electrical circuits with optical circuits. The optical circuits are light in weight, secure, resistant to many types of radiation, and of small dimension. More information can be transmitted through an optical line than through an electrical line of comparable size and weight. Just as electrical circuits require various types of devices and methods for their fabrication, optical circuits also require methods for fabricating specialized optical devices. The present invention deals with a method having wide applicability in the fabrication of optical devices, particularly waveguides and related circuit elements.

In some integrated optical circuits, light is guided through the optical circuit by means of planar optical waveguides. (These optical waveguides in the form of flat glass laminates operate to transmit electromagnetic energy of wavelengths in or near the visible spectrum (i.e., light) and include an inner planar glass core of transparent material which acts as the waveguiding layer, sandwiched between two transparent layers such as glass having a lower refractive index than the core.) Due to this difference between the index of refraction of the core and the cladding, total internal reflection occurs, and the light entering one end of the thin planar waveguide is internally reflected along its length. According to the principle of total internal reflection, light entering the waveguide with the proper entry angle will be internally reflected at the interface between the core and the cladding, and will proceed down the length of the waveguide with multiple internal reflections from the cladding layers on the two sides of the core, without any loss of intensity regardless of the multiple reflections.

If the waveguide is long, there must be such total internal reflection for the waveguide to be operable, as even a small percentage reduction of light intensity on each reflection would result in insufficient intensity of the beam emerging from the waveguide. Consequently, the optical waveguide must be carefully constructed so as to avoid any loss or leakage of light from the waveguide.

The glass used to construct an optical waveguide is highly perfect, with a low density of imperfections that could scatter light in a direction whereby the light would not be totally internally reflected. Moreover, to achieve the proper numerical entry angles for total internal reflection within the waveguide, the indices of refraction of the glass of the core and the cladding should be close together, and typically differ by only about 2 percent. For a typical planar optical waveguide, the core is BaK2 glass having a refractive index of 1.540, and the cladding is K5 glass having a refractive index of 1.522.

The core and the cladding must be joined together carefully so as to avoid surface imperfections that would scatter the light, or would cause irregularities such that the light is directed at the surface at an improper angle at which total internal reflection would not occur. In one method known in the art, the pieces of glass are carefully lapped to a flat surface. They are next heated to their softening temperatures and fused together, and then cooled to ambient temperature. Because of the small difference in the coefficients of thermal expansion of the glasses used to make the core and the cladding, and the large temperature difference between the fusing temperature and ambient temperature, thermal strains arise at the interface upon cooling, resulting in a rippled surface pattern at the internal interfaces between the core and the cladding on either side. This rippling effect causes excessive attenuation of the light at each internal reflection, reducing the efficiency of the optical waveguide.

It would be desirable, therefore, to have a technique for bonding the core and the cladding together which does not require excessive heating and cooling during manufacture. With this objective in mind, various optical bonding techniques have been developed. (Conventional optical adhesives or cements have indices of refraction greater than the glass of the waveguide and are therefore inoperable, because light can become trapped within the layer of cement.) Additionally, some do not bond well to glass, resulting in reduced strength and leaving unbonded regions that scatter the reflected light. Polymeric materials that are otherwise candidates for bonding agents often are inert and do not bond well to glass. Other bonding techniques may require complex surface treatments of the glass and moderate heating that results in a minor, but noticeable, degree of rippling at the internal interfaces.

Thus, there exists a need for a method of bonding glass pieces together for use in critical optical applications such as waveguides. The method should be operable with no or minimal heating of the glass pieces during bonding, and must result in a highly perfect interface that does not scatter light upon internal reflection. The bonding agent at the interface must have an index of refraction sufficiency less than the index of refraction of the cladding that light is not trapped in the interface upon internal reflection. The present invention fulfills this need, and further provides related advantages.

SUMMARY OF THE INVENTION

The present invention provides a method of bonding glass in optical systems which results in a highly perfect, planar bonded interface that has neither unbonded regions nor defects such as the ripples induced by thermal strains. The index of refraction of the bonding medium is less than 1.50, well below that of the glass used in constructing the optical system. The interface has wide spectral transmission, excellent adhesion, and good temperature and moisture resistance. The process is accomplished with readily available, simple equipment and without the need for a high degree of skill, and is therefore useful in a variety of optical assembly applications.

In accordance with the invention, a process for bonding together two transparent pieces of glass comprises the steps of treating the surfaces to be bonded with an organosilane coupling agent; preparing a flowable adhesive, consisting essentially of a transparent polymerizable monomer having a refractive index less than those of the pieces of glass, a thickening agent, and a polymerization initiator; placing a layer of the flowable adhesive between the pieces of glass; and polymerizing the adhesive, thereby bonding together the pieces of glass. The two pieces are thereby bonded together by a liquid adhesive which flows into all regions of the interface, and does not require heating if the polymerization is accomplished by a means such as ultraviolet light.

Since presently used optical glasses have an index of refraction of greater than 1.50, a process for bonding together two transparent pieces of glass comprises the steps of treating the surfaces to be bonded with an organosilane coupling agent; preparing a flowable adhesive, consisting essentially of a transparent polymerizable monomer having a refractive index no greater than 1.50, a thickening agent, and a polymerization initiator; placing a layer of the flowable adhesive between the pieces of glass; and polymerizing the adhesive, thereby bonding together the pieces of glass.

The surfaces of the glass are treated to improve the bonding of the polymer adhesive to the glass. An organosilane coupling agent is applied to the glass surfaces, producing a layer of activated molecules bonded to the hydroxyl groups at the surface of the glass. These activated organosilane molecules in turn are readily bonded to the polymerized adhesive, producing a true chemical bond between the glass pieces. Any standard organosilane coupling agent can be used. The organosilane coupling agent is normally prepared as a dilute solution of the organosilane in a solvent, which can be flooded, spun, brushed, or otherwise conveniently applied to the surface of the glass. After application, the glass with the liquid surface activator thereon is heated to evaporate the solvent and react the organosilane with the glass.

For use with glass having an index of refraction of greater than 1.50, the adhesive is prepared by mixing a polymerizable monomer having a refractive index of 1.50 or less, a thickening agent, and an initiator for the polymerization. This mixture can be prepared in a variety of consistencies from a liquid to a paste. The term used herein to describe such a mixture is "flowable", which distinguishes it from a rigid solid such as a cured epoxy.

The polymerizable monomer is polymerized by the combination of the external energy applied and the initiator. However, the consistency of the monomer prior to polymerization may not be suitable for application to the surfaces of the glass, and the thickening agent is supplied to increase the viscosity and consistency of the mixture. The thickening agent also performs the important function of aiding in minimizing the shrinkage of the cement volume upon curing, as any such shrinkage tends to distort the interfaces of the glass pieces. In some cases, the thickener reduces the degree of crystallinity observed in those polymers that tend to form crystals.

Any suitable flowable transparent polymerizable monomer having a refractive index no greater than 1.50 can be used. The monomer should have as low a degree of crystallinity as possible, and therefore the glass transition temperature $T_G$ should be lower than the lowest operating temperature at which the optical device is to be used. At temperatures below $T_G$, the polymerized monomer will exhibit at least some degree of crystallinity, which will tend to scatter the light and reduce the efficiency of the optical device. At temperatures above $T_G$, the polymerized monomer will be non-crystalline and hence exhibit reduced tendency to scatter light, so that the optical loss is reduced. The monomer should also be soluble if a mix of monomers is used, so that a homogeneous composition is maintained before and during curing.

Presently (known) and acceptable monomers, together with their respective refractive indices measured at the sodium line in parentheses, include pentadecafluorooctyl acrylate (1.339), tetrafluoro-3-(heptafluoropropoxy)propyl acrylate (1.346), tetrafluoro-3-(pentafluoroethoxy)propyl acrylate (1.348), undecafluorohexyl acrylate (1.356), nonafluoropentyl acrylate (1.360), tetrafluoro-3-(trifluoromethoxy)propyl acrylate (1.360), pentafluorovinyl propionate (1.364), heptafluorobutyl acrylate (1.367), trifluorovinyl acetate (1.375), octafluoropentyl acrylate (1.380), pentafluoropropyl acrylate (1.385), 2-(heptafluorobutoxy)ethyl acrylate (1.390), 2,2,3,4,4,4-hexafluorobutyl acrylate (1.392), trifluoroethyl acrylate (1.407), 2-(1,1,2,2-tetrafluoroethoxy)ethyl acrylate (1.412), trifluoroisopropyl methacrylate (1.4177), 2,2,2-trifluoro-1-methylethyl methacrylate (1.4185), 2-(trifluoroethoxyethyl) acrylate (1.419), trifluoroethyl methacrylate (1.437), 4-fluoro-2-trifluoromethylstyrene (1.46), 2-methoxyethyl acrylate (1.463), butyl acrylate (1.464), tert-butyl methacrylate (1.464), 3-ethoxypropyl acrylate (1.465), and vinyl acetate (1.467).

Mixtures of these monomers can also be used, where the components of the mixture are mutually soluble. As used herein, the term "monomer" includes mixtures of pure monomers. To a first order, the refractive index of the mixture is the sum of the products of the mole fraction of each component present in the mixture times the refractive index of that component. The preparation of a mixture can therefore be used to achieve a refractive index of a desired value, but which is unavailable from a pure monomer. The preparation of a mixture of monomers can also achieve different curing characteristics, viscosity, strength, adhesion, or other desired physical properties.

Any suitable thickening agent can be used, but it must be kept in mind that the presence of the thickening agent, even in small amounts, can alter the optical properties of the adhesive. The preferred approach to the preparation of a thickener is therefore to use the same monomer or mixture of monomers as in the primary monomer component of the mixture, but to pre-polymerize the thickening agent prior to its addition to the mixture.

The pre-polymerization increases the viscosity of the thickening agent, but does not significantly change its refractive index. Since the thickening agent is of the same chemical composition as the monomer or monomer mixture, its addition will not substantially alter the refractive index of the adhesive mixture.

Specifically, the thickener may be prepared by taking a portion of the monomer or monomer mixture to be used, with or without a solvent, adding a polymerization initiator, and thermally or otherwise polymerizing the mixture to a desired consistency. This process produces a thickening agent which is more viscous and thicker than the monomer or mixture that is to be used as the primary component of the mixture, and can be added to the primary component to increase its viscosity and thickness.

The initiator is any suitable material which, when present in small amounts, aids in the initiation of polymerization of the monomer. Polymerization of the monomer can be accomplished through the suitable addition of energy. One method of polymerizing is to heat the monomer. However, in view of the undesirable results of thermal shrinkage, it is preferred that the pieces of optical glass be bonded at or near their temperature of use, which is normally ambient temperature. An alternative approach to supplying energy for polymerization is to expose the adhesive to ultraviolet light. An initiator is used to aid in the process. Presently known, suitable initiators include benzoyl peroxide and 2,2'-azo-bis-isobutyronitrile (AIBN). Such initiators are used both in the prepolymerization of monomers to form the thickener, and in the polymerization of monomers to form the adhesive.

To bond two pieces of glass together, the surfaces to be bonded are cleaned and then contacted to a solution of the coupling agent. The glass pieces are heated to evaporate the solvent and to react the coupling agent with the species present at the surface of the glass, typically hydroxyl groups. The glass pieces are not in bonding contact during this heating procedure, and therefore they expand and contract freely during heating and cooling. Thermal stresses and strains are absent. It has been found that the pieces of glass so treated can be stored for extended periods of time prior to bonding, and therefore it is not necessary to perform the bonding with undue haste.

An adhesive mixture of suitable monomer, thickening agent, and initiator is prepared. It has been found that best bonding results are obtained when the consistency of the flowable adhesive is that of a glue or paste. The consistency is adjusted by varying the amount of the thickening agent in the mixture. The adhesive is applied to one of the surfaces to be bonded, and the other pressed into place. The adhesive could also be applied to both pieces to be bonded, and then the adhesive-coated surfaces pressed together.

The adhesive is cured by supplying energy, preferably ultraviolet light. Curing is done by exposing the glass/adhesive/glass laminate to ultraviolet light of moderate intensity, as from a medium pressure mercury lamp. During the ultraviolet irradiation, the initiator molecules decompose into radicals that cause the monomer units to polymerize, thus curing the adhesive cement. The adhesive also bonds to the reactive monomer units contained in the coupling agent at the surface of the glass pieces, forming a true chemical bond at each glass/adhesive interface. Alternatively, the curing may be accomplished by heating the adhesive to a moderate temperature of from about 40° C. to about 100° C., but upon cooling there may be a minor degree of thermally induced distortion, as the bonding is completed at elevated temperature before cooling. Curing with UV light is therefore preferred.

The resulting glass laminate has properties that are unique and otherwise unavailable in optical glass bonded pieces. The refractive index of the adhesive is lower than those of the glass pieces. There is substantially no thermal stress and strain at the interface, even though the glass pieces are rigidly and strongly bonded so that they can usually be separated only by destroying one or both of the pieces.

It will be appreciated that the approach of the invention therefore provides an important advance in the art of bonding optical glass for use in optical devices. Pieces are bonded with an adhesive that is strong and has a refractive index less than that of the glass pieces bonded. The adhesive can be cured without heating the laminate substantially, so that thermal strains that might interfere with optical properties are absent. Other features and advantages of the invention will be apparent from the following more detailed description, taken in conjunction with the accompanying drawing, which description illustrates, by way of example, the principles of the invention.

DETAILED DESCRIPTION OF THE PREFERRED EMBODIMENT

Figure 1:
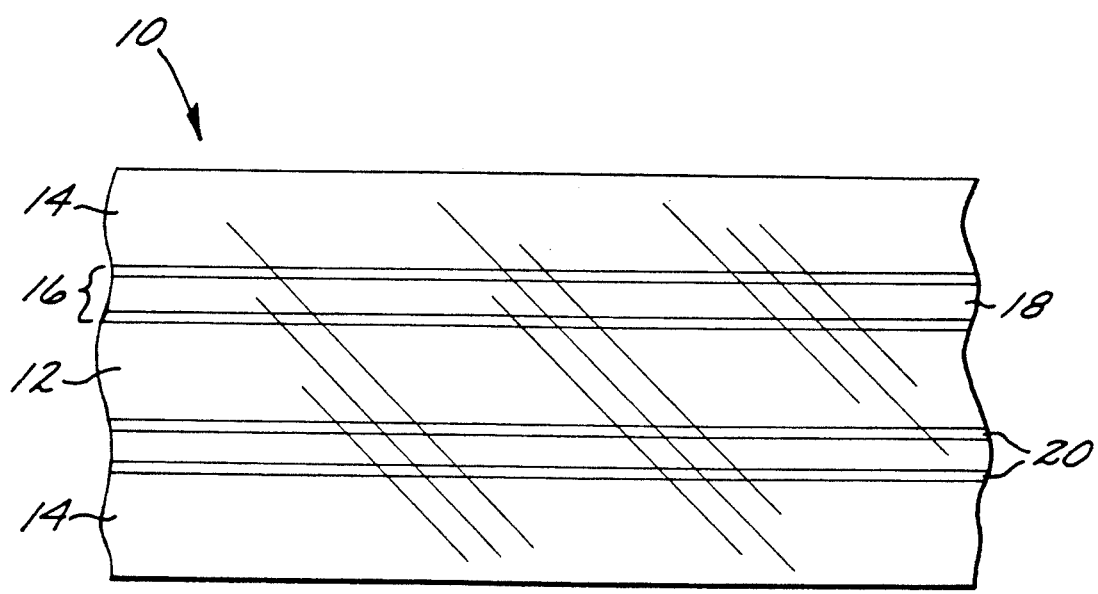
FIG. 1 is a side elevational view of an optical waveguide made in accordance with the invention.

The process of the invention is used to bond together pieces of glass, as for example, the pieces of glass used in an optical waveguide 10, illustrated in FIG. 1. In the waveguide 10, a core layer 12 is encased between two cladding layers 14, and each side of the core layer 12 is bonded to one of the cladding layers 14 along an interface 16. Both the core layer 12 and the cladding layers 14 are optical quality glass, with the index of refraction of the core layer 12 slightly higher than that of the cladding layers 14. Typically, the index of refraction of the glass of the core layer 12 is about 1.54, and the index of refraction of the glass of the cladding layers 14 is about 1.52. An adhesive layer 18, which is transparent and has an index of refraction less than that of both the core layer 12 and the cladding layers 14, bonds the core layer 12 to each of the cladding layers 14. When light enters the core layer 12 of the waveguide 10 at the correct angle, as from the left in the illustration, the light is propagated along the waveguide 10, substantially without loss of intensity, and emerges at the other end of the waveguide 10.

The bonding of two pieces of glass, as the core layer 12 and the cladding layer 14, is accomplished by the process of the invention. The pieces of glass are treated to provide bonding sites along the surfaces to be bonded. The surfaces of the glass normally include hydroxyl groups that do not readily bond with monomers and polymers. Consequently, the organic molecules that are candidates for use in optical-quality adhesives do not bond well to the glass. To promote adhesion of monomers and polymers to the otherwise-inert glass surface, the glass surface is provided with a thin layer 20 of a coupling agent that bonds to the hydroxyl groups in the glass surface, and also includes reactive groups to bond to the growing polymer molecules in the adhesive layer during curing. Thus, with this approach, the cross section through the bonded glass pieces includes glass, coupling agent layer, adhesive layer, coupling agent layer, and glass. The coupling agent layer 20 is typically very thin, usually only one molecule thick, but has been shown with exaggerated thickness in FIG. 1 for the purposes of illustration.

A typical example of a coupling agent is an organosilane molecule represented as:

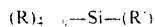

wherein n has a value of 1 to 3, R represents a functional group capable of reacting with a hydroxyl group, such as halogen, alkoxy, alkoxyalkoxy, acyloxy, phenoxy, oxime or amino, and R' represents a functional group capable of reacting with the polymer of the adhesive under the conditions of polymerization, such as methacryloyloxypropyl (—(CH$_2$)$_3$O$_2$CC(CH$_3$)CH$_2$), acryloyloxypropyl (—(CH$_2$)$_3$O$_2$CCHCH$_2$), styryl (—C$_6$H$_4$CHCH$_2$), vinyl (—CHCH$_2$), and allyl (—CH$_2$CHCH$_2$). The functional portion of R' is bonded to the silicon of the silane coupling agent by a carbon to silicon bond which will withstand breakdown on exposure to extreme environmental conditions. The functional portion of R' may be an olefinic radical such as vinyl (C=C). Radicals containing conjugated double bonds are more stable and do not function as well, but a double bond conjugated to an aromatic structure is acceptable.

The coupling agent is ordinarily provided to the glass surface in a diluted form. To provide the coupling agent, the organosilane coupling agent is dissolved in a solvent, and the mixture applied to the glass surface by flooding, dipping, spinning, brushing, or the like. The solvent is evaporated, and the R group of the coupling agent is displaced by the hydroxyl group of the glass surface, forming a bond between the surface and the silicon atom, by heating the glass surface with the applied mixture to a temperature of from about 150° C. to about 200° C., in air, for about 5 minutes. These parameters are not critical. The glass pieces are not in contact with each other when this heating step is performed, so that there are no residual stresses upon cooling. This step does not actually bond the pieces together, but instead pretreats the glass surfaces preparatory to bonding. The presently preferred mixture of coupling agent and solvent is a 0.4 percent solution of methacryloyloxypropyltrimethoxysilane in toluene.

The adhesive used to bond the pieces of glass together is a flowable mixture of a transparent polymerizable monomer (i.e., a single monomer species or a mixture of monomers) having a refractive index no greater than about 1.50, a thickening agent, and a polymerization initiator. The presently known monomers include pentadecafluorooctyl acrylate, tetrafluoro-3-(heptafluoropropoxy)propyl acrylate, tetrafluoro-3-(pentafluoroethoxy)propyl acrylate, undecafluorohexyl acrylate, nonafluoropentyl acrylate, tetrafluoro-3-(trifluoromethoxy)propyl acrylate, pentafluorovinyl propionate, heptafluorobutyl acrylate, trifluorovinyl acetate, octafluoropentyl acrylate, pentafluoropropyl acrylate, 2-heptafluorobutoxy)ethyl acrylate, 2,2,3,4,4,4-hexafluorobutyl acrylate, trifluoroethyl acrylate, 2-(1,1,2,2-tetrafluoroethoxy)ethyl acrylate, trifluoroisopropyl methacrylate, 2,2,2-trifluoro-1-methylethyl methacrylate, 2-(trifluoroethoxyethyl) acrylate, trifluoroethyl methacrylate, 4-fluoro-2-trifluoromethylstyrene, 2-methoxyethyl acrylate, butyl acrylate, tert-butyl methacrylate, 3-ethoxypropyl acrylate, and vinyl acetate. Of these, the preferred monomer is a mixture of equal parts of trifluoroethyl acrylate and trifluoroethyl methacrylate.

None of the known monomers, including mixtures of monomers, has the necessary polymerization, bonding, shrinkage, and consistency required for the adhesive. It is therefore necessary to add a thickening agent as an important part of the adhesive mixture. The thickening agent performs important functions of adjusting the consistency of the uncured adhesive mixture so that it may be readily applied to the glass surfaces to be bonded, reducing the tendency of the monomer to crystallize extensively, and decreasing the shrinkage of the adhesive upon polymerization of the monomers. The presently preferred thickening agent is a mixture of equal parts of trifluoroethyl acrylate and trifluoroethyl methacrylate, to which the initiator 2,2'-azo-bis-isobutyronitrile is added. Most preferably, a mixture is formed of 5 parts by weight of trifluoroethyl methacrylate, 15 parts by weight of trifluoroethyl acrylate, 0.2 parts by weight of 2,2'-azo-bis-isobutyronitrile, and 80 parts by weight of toluene. This mixture is thermally polymerized by heating to a temperature of 60° C. for 46 hours, to produce a polymer that has a thickness of greater than that of the unpolymerized mixture of monomers. The thermal polymerization of the thickening agent is accomplished prior to its mixing with the monomer, and prior to the actual bonding of the pieces of glass, so that the pieces of glass need not be heated above ambient temperature. This thickener has a refractive index of about 1.41 and a $T_G$ below ambient temperature. The thickener can be mixed into the mixture of unpolymerized monomers to increase the viscosity of the mixture, in an amount appropriate to achieve the desired degree of fluidity and workability. Experience has shown that the adhesive is most easily and readily applied when its viscosity and consistency is like that of glue or paste.

Before mixing the monomer and the thickening agent, an initiator for polymerization is added to the flowable adhesive mixture. The initiator is preferably benzoyl peroxide or 2,2'-azo-bis-isobutyronitrile, but may be any suitable peroxide, azo, azonitrile, perester, peroxy carbonate, or other radical initiator.

The preferred monomer, thickening agent, and initiator are mixed together in a preferred ratio of 100 parts trifluoroethyl acrylate, 100 parts trifluoroethyl methacrylate, 50 parts thickener, 1 part initiator. The unpolymerized mixture has a consistency of thick glue or paste. It is applied to the surface of one of the glass pieces that has previously been treated with the coupling agent. The second glass piece is pressed into place, so that the layer of adhesive 18 is about 5–20 micrometers thick. If another piece of glass is further to be bonded, as in the case of the waveguide 10, it is similarly affixed with treated surfaces facing each other. The resulting uncured laminate is then subjected to energy sufficient, in combination with the initiator, to cause the monomers in the adhesive to polymerize. The necessary energy is preferably supplied by ultraviolet radiation, such as produced by a medium pressure mercury lamp. The energy may also be thermal energy produced by heating the mixture, but this alternative approach may result in some thermal strains in the interface between the glass pieces upon cooling. Polymerization by UV light is achieved in from about 1 to about 15 minutes, using UV light of wavelength 350–450 nanometers, from a 350 watt medium pressure UV lamp placed about 1 foot from the polymerizing material. Other wavelengths of UV light and types of UV sources are also acceptable. The polymerization process can be shortened by the use of more initiator or more intense UV light.

During the polymerization process, the initiator molecules decompose into radicals that cause the monomer units to polymerize. The R' units of the coupling agent bond to reactive groups of the polymers being produced from the monomers, thereby bonding the polymers to the hydroxyl groups of the glass surfaces, through the coupling agent, in a true chemical bond. The resulting bonded structure is unique, in that it comprises a piece of glass bonded to another piece of glass with an optical quality adhesive having an index of refraction of less than 1.50, and has not been heated substantially above ambient temperature during the bonding process (as distinct from the pretreatment step). There is therefore virtually no thermally induced strain in the plane of the interface between the pieces of glass, which would cause light loss if present.

The following examples serve to illustrate aspects of the invention, but should not be taken as limiting of the invention in any respect. In these examples, the following shorthand notations are used: trifluoroethyl acrylate, TFEA; trifluoroethyl methacrylate, TFEMA; tridecafluoroheptyl methacrylate, TDEMA; and tetraethyleneglycol diacrylate, TEGDA, and parts of ingredients are by weight.

EXAMPLE 1

Two glass plates were pre-treated by immersion in a 0.4 percent solution of methacryloyloxypropyltrimethoxysilane (MTS) in toluene. The plates were then baked in air at about 150° C. to about 200° C. for 5 minutes.

An adhesive mixture was prepared of 100 parts TFEA, 100 parts TFEMA, 50 parts thickener, and 1 part initiator, all parts by weight. The thickener had been previously prepared by thermally polymerizing a mixture of 15 parts TFEA and 5 parts TFEMA in 80 parts toluene, with 0.2 parts of the initiator 2,2'-azo-bis-isobutyronitrile (AIBN). This thickener mixture had been thermally polymerized by heating to 60° C. for 46 hours. The initiator for the adhesive mixture was AIBN.

The adhesive mixture, which had a pastelike consistency, was coated onto one of the previously treated surfaces of the glass plates in a coating about 50 micrometers thick. The other glass surface was pressed into place. This laminate was exposed to ultraviolet light from a medium pressure mercury lamp, for 5 minutes, to cure the adhesive and bond the laminates together. The resulting adhesive was transparent with a refractive index of about 1.42, noncrystalline, and durable to heat and moisture. The plates were firmly bonded together by the adhesive.

EXAMPLE 2

Example 1 was repeated, except using benzoyl peroxide as the initiator for the adhesive mixture. The results were substantially the same.

EXAMPLE 3

Example 1 was repeated, except that the polymerization of the adhesive mixture was accomplished by thermal energy. The glass plates with the adhesive mixture were heated to a temperature of about 60° C. for a period of 10 minutes. The results were substantially the same, except that there was some thermally induced strain at the interface between the glass plates.

EXAMPLE 4

Two glass plates were pre-treated by immersion in a 0.4 percent solution of methacryloyloxypropyltrimethoxysilane (MTS) in toluene. The plates were then baked in air at about 150° C. to about 200° C. for 5 minutes.

A mixture was prepared containing 70 parts TFEA, 10 parts TFEMA, 10 parts TDEMA, and 10 parts TEGDA, all parts by weight. For each 5 grams of the mixture, 0.050 grams of AIBN was added as initiator.

The adhesive mixture, which had a viscous consistency, was coated onto one of the previously treated surfaces of the glass plates in a coating about 50 micrometers thick. The other glass surface was pressed into place. This laminate was exposed to ultraviolet light from a medium pressure mercury lamp, for 5 minutes, to cure the adhesive and bond the laminates together. The resulting adhesive layer was transparent and noncrystalline, had good adhesion, and exhibited some shrinking.

EXAMPLE 5

Example 4 was repeated, except that a thickener was added to the adhesive mixture before polymerizing with UV light. The thickener was prepared in the manner described in Example 1, and was added in the amount of 1 part to 2 parts of the monomers. The addition of the thickener improved the adhesive, in that the liquid monomer mixtures were easier to work with and exhibited less shrinkage upon polymerization.

EXAMPLE 6

Example 4 was repeated, except that the monomer was a mixture of 60 parts TFEA, 20 parts TFEMA, and 20 parts TDEMA. The resulting adhesive was similar to that of Example 4, except that slightly more shrinkage upon curing was observed.

EXAMPLE 7

Example 5 was repeated, except using the monomer mixture of Example 6. The results were similar to those of Example 5.

EXAMPLE 8

Example 4 was repeated, except that the monomer was a mixture of 80 parts TFEA and 20 parts TEGDA. The resulting adhesive was slow to polymerize and exhibited some crystals.

EXAMPLE 9

Example 5 was repeated, except using the monomer mixture of Example 8. The results were similar to those of Example 5.

EXAMPLE 10

Example 4 was repeated, except that the monomer mixture was 70 parts TFEA, 20 parts TDEMA, and 10 parts TEGDA. The results were similar to those of Example 4, except that more shrinkage upon curing was observed.

EXAMPLE 11

Example 5 was repeated, except using the monomer mixture of Example 10. The results were similar to those of Example 5.

These examples demonstrate that the addition of the thickener is important to achieving excellent properties of the finished adhesive, and that such properties can be obtained in mixtures of monomers.

Other mixtures having compositions of 60 parts TFEA, 20 parts TFEMA, and 20 parts TEGDA; 50 parts TFEA, 10 parts TDEMA, and 40 parts TEGDA; and 50 parts TFEA, 40 parts TFEMA, and 10 parts TDEMA were incompletely polymerized and would require further polymerization treatment before being useful.

It is now apparent that the present invention permits a major improvement in the fabrication of optical devices. Pieces of glass can be joined by a cement or adhesive that has a low refractive index and low interfacial distortion. Although several particular embodiments of the invention have been described in detail for purposes of illustration, various modifications may be made without departing from the spirit and scope of the invention.

Accordingly, the invention is not to be limited except as by the appended claims.

What is claimed is:

1. A process for bonding together two transparent pieces of glass to form an optical glass laminate, comprising the steps of:

contacting the glass surfaces to be bonded with a solution of an organosilane coupling agent having at least one functional group capable of reacting with a hydroxyl group;

preparing an adhesive consisting of a mixture of
   a monomer selected from the group consisting of pentadecafluorooctyl acrylate, tetrafluoro-3-(heptafluoropropoxy) propyl acrylate, tetrafluoro-3-(pentafluorethoxy) propyl acrylate, undecafluorohexyl acrylate, nonafluoropentyl acrylate, tetrafluoro-3-(trifluoromethoxy) propyl acrylate, pentafluorovinyl propionate, heptafluorobutyl acrylate, trifluorovinyl acetate, octafluoropentyl acrylate, pentafluoropropyl acrylate, 2-(heptafluorobutoxy) ethyl acrylate, 2,2,3,4,4,4-hexafluorobutyl acrylate, trifluoroethyl acrylate, 2-(1,1,2,2-tetrafluoroethoxy) ethyl acrylate, trifluoroisopropyl methacrylate, 2,2,2-trifluoro-1-methylethyl methacrylate, 2-(trifluoroethoxyethyl) acrylate, trifluoroethyl methacrylate, 4-fluoro-2-trifluoromethylstyrene, 2-methoxyethyl acrylate, butyl acrylate, tert-butyl methacrylate, 3-ethoxypropyl acrylate, and vinyl acetate, and mixtures thereof, a thickening agent, and an initiator agent for the polymerization of the monomer; placing a layer of the adhesive between the pieces of glass; and polymerizing the adhesive at a temperature at which the adhesive after polymerization is transparent and noncrystalline, thereby bonding together the pieces of glass.

2. The process of claim 1, wherein the monomer is a mixture of trifluoroethyl acrylate and trifluoroethyl methacrylate, the thickener is a pre-polymerized mixture of trifluoroethyl acrylate, trifluoroethyl methacrylate, and azobisisobutyronitrile, and the initiator is azobisisobutyronitrile.

3. The process of claim 2, wherein the composition of the adhesive is about 100 parts trifluoroethyl acrylate, 100 parts trifluoroethyl methacrylate, 50 parts thickener, and 1 part initiator.

4. A bonded structure prepared by the process of claim 1.

5. An optical waveguide prepared by the process of claim 1.

* * * * *